US006981151B1

(12) United States Patent
Groeneveld et al.

(10) Patent No.: US 6,981,151 B1
(45) Date of Patent: Dec. 27, 2005

(54) DIGITAL DATA STORAGE SYSTEMS, COMPUTERS, AND DATA VERIFICATION METHODS

(75) Inventors: Bennett J. Groeneveld, Idaho Falls, ID (US); Wayne E. Austad, Idaho Falls, ID (US); Stuart C. Walsh, Idaho Falls, ID (US); Catherine A. Herring, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 0 days.

(21) Appl. No.: 09/544,777

(22) Filed: Apr. 7, 2000

Related U.S. Application Data (60) Provisional application No. 60/128,605, filed on Apr. 8, 1999.

(51) Int. Cl.$^7$ ............... H04L 9/32; G06F 12/00
(52) U.S. Cl. ............ 713/193; 713/194; 713/175; 713/176
(58) Field of Search ................. 713/200, 201, 713/193, 194, 176, 175

(56) References Cited

U.S. PATENT DOCUMENTS

| | | | | |
|---|---|---|---|---|
| 5,737,419 | A | * | 4/1998 | Ganesan ............... 713/169 |
| 6,209,091 | B1 | * | 3/2001 | Sudia et al. ............ 713/175 |
| 6,310,966 | B1 | * | 10/2001 | Dulude et al. .......... 382/115 |
| 6,368,219 | B1 | * | 4/2002 | Szrek et al. ............ 463/42 |
| 2002/0062438 | A1 | * | 5/2002 | Asay et al. ............ 713/157 |
| 2003/0028761 | A1 | * | 2/2003 | Platt ..................... 713/150 |

OTHER PUBLICATIONS

"ABA Digital Signatures Guidelines"; "Legal Infrastructure for Certification Authorities and Secure Electronic Commerce"; Aug. 1, 1996; pps. 1-132.

"TRIPS Mini Design R3.0"; B. Groeneveld, W. Austad, C. Herring, K. Wagner; pps. 1-5.
"TRIPS Technical Investigation"; Scalability of Electronic Approval Snapshots; OS Flat Files vs. LDAP; S. Walsh, B. Novak, W. Austad; May 5, 1998; 3 pages.
"TRIPS Mini Design" "Data Validation Business Rules"; M. Sherick, K. Lundquist; L. Pask; E. Dumas, S. Hailey, R. Arbon, G. Hayes, G. Twedell, C. Crowder, and B. Evans; Jul. 15, 1998; pps. 1-5.
"TRIPS Mini Design" "Electronic Signature Architecture"; W. Austad, S. Walsh, C. Herring, and B. Groeneveld; Sep. 28, 1998; pps. 1-8.
"Transuranic Reporting, Inventory, and Processing System (TRIPS) Electronic Signature Background Document"; Nov. 3, 1997; pps. 1-22.
"PKCS #1: RSA Encryption Standard, Version 1.5"; RSA Laboratories; Nov. 1, 1993; pps. 1-37.
"TRIPS Mini Design" "Electronic Approval (Draft—R4 Design Base)"; W. Austad, S. Walsh, C. Herring; Apr. 7, 1998; pps. 1-37.
PKCS #11: Cryptographic Token Interface Standard; Version 2.01; Dec. 22, 1997; pps. 1-246.
"Useful Terminal Services Resource Kit Utilities" http://support.microsoft.com/support/kb/articles/Q240/4/44.ASP?LN=EN-US&SD=gn&FR=0; Aug. 8, 2000; 2 pages.

(Continued)

Primary Examiner—Norman M. Wright
(74) Attorney, Agent, or Firm—Wells, St. John P.S.

(57) ABSTRACT

Digital data storage systems, computers, and data verification methods are provided. According to a first aspect of the invention, a computer includes an interface adapted to couple with a dynamic database; and processing circuitry configured to provide a first hash from digital data stored within a portion of the dynamic database at an initial moment in time, to provide a second hash from digital data stored within the portion of the dynamic database at a subsequent moment in time, and to compare the first hash and the second hash.

31 Claims, 5 Drawing Sheets

OTHER PUBLICATIONS

"JetForm" "FormFlow®"; "The Next Generation E-forms Solution from JetForm"; "Product White Paper"; pps. 1-29.

"Non-Repudiatible—Electronic Signatures in the Transuranic Reporting and Inventory Processing System"; R.G. Oesterling, W.E. Austad; B.J. Groenveld; C.A. Herring, C. Mancuso; S.C. Walsh; pps. 1-17.

"Enterprise Reality" "Creating Data Confidence Through Access Controls and Electronic Signatures"; Carol Mancuso; May 3-6, 1998; pps. 1-36.

"Using Public Key Digital Signatures in Paperless Information Systems" http://www.gradkell.com/PKI; Jun. 4, 1999; pps. 1-18.

* cited by examiner

DIGITAL DATA STORAGE SYSTEMS, COMPUTERS, AND DATA VERIFICATION METHODS

CROSS REFERENCE TO RELATED APPLICATIONS

This application claims priority from U.S. Provisional Application Ser. No. 60/128,605, filed Apr. 8, 1999, titled "Digital Signature System With Non-Repudiation For Relational Databases", and incorporated herein by reference.

CONTRACTURAL ORIGIN OF THE INVENTION

This invention was made with Government support under Contract DE-AC07-991D 13727, awarded by the United States Department of Energy. The United States Government has certain rights in the invention.

TECHNICAL FIELD

The invention provides digital data storage systems, computers, and data verification methods.

BACKGROUND OF THE INVENTION

Digital signatures have been provided for non-repudiation wherein the user is associated with a given set of data and the signer can not deny participation with the signature. A digital signature associates a digital or numerical code with a set of electronic data. The code is generated using a private key that uniquely identifies the person that is approving the contents of the data.

To create a digital signature, an encryption process, such as DES or Triple DES for example, is utilized with a private key to encrypt a hash of the data set. The private key is associated with a given user. Thereafter, a public key which corresponds to the private key is utilized to decrypt the encrypted data to arrive at the original data set.

Digital signatures provide security benefits of identification and authentication plus data integrity to arrive at non-repudiation. The identity of the signing person of a transaction is known and can be proven to a third party. The signature is linked to the user. The signature is also linked to the data being signed such that if the data is changed, the signature is invalidated. For non-repudiation, the signing party can not deny having signed the transaction inasmuch as the signature is linked to the user and the data.

Previous paper-oriented tasks such as vendor payment were processed by routing paper around the organization. Approvals were hand-written signatures on paper. However, the aims of arriving at substantially paperless initiatives and improving the practice of obtaining authorization have resulted in wider acceptance and usage of digital signatures.

There exists a need to provide improved storage and verification systems utilizing digital signatures.

BRIEF DESCRIPTION OF THE DRAWINGS

Preferred embodiments of the invention are described below with reference to the following accompanying drawings.

FIG. 6 is a flow chart illustrating an exemplary methodology of cross-verification of a digital signature.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

According to a first aspect of the invention, a computer includes an interface adapted to couple with a dynamic database; and processing circuitry configured to provide a first hash from digital data stored within a portion of the dynamic database at an initial moment in time, to provide a second hash from digital data stored within the portion of the dynamic database at a subsequent moment in time, and to compare the first hash and the second hash.

A second aspect of the invention provides a system comprising: storage circuitry configured to store digital data at least some of which dynamically changes with respect to time, and to store a digital signature generated using digital data stored within the storage circuitry at an initial moment in time; and processing circuitry configured to provide a first hash from the digital signature, and to provide a second hash from digital data stored within the storage circuitry at a subsequent moment in time and corresponding to the digital data of the digital signature, and to compare the first hash and the second hash.

Another aspect of the invention provides a digital data system comprising: storage circuitry configured to store digital data at least some of which dynamically changes with respect to time; and processing circuitry configured to compare a first hash and a second hash, wherein the first hash corresponds to digital data stored within the storage circuitry at an initial moment in time and the second hash corresponds to digital data stored within the storage circuitry at a subsequent moment in time.

According to another aspect, a digital data storage system comprises: a dynamic database containing a plurality of tables individually configured to store digital data; a snapshot database configured to store a snapshot of digital data retrieved from at least one table of the dynamic database at an initial moment in time; an approval database configured to store a digital signature of the snapshot; and a client configured to provide the digital signature from the snapshot, to provide a first hash from the snapshot, to provide a second hash from the digital signature, to compare the first hash and the second hash, to provide a third hash from data stored within the at least one table of the dynamic database at a subsequent moment in time, and to compare the third hash and the second hash.

Another aspect provides a data verification method comprising: storing digital data at an initial moment in time within a dynamic database; providing a first hash of the digital data stored at the initial moment in time; providing a second hash of digital data within the dynamic database at a subsequent moment in time; and comparing the first hash and the second hash.

Yet another aspect provides a data verification method comprising: providing digital data at an initial moment in time within a portion of a dynamic database; storing a static form of the digital data stored at the initial moment in time within a static database; providing a digital signature using the static form of the digital data; providing a first hash of the digital data stored at the initial moment in time using the digital signature; providing a second hash of the digital data stored at the initial moment in time using the static form of the digital data; comparing the first hash and the second hash; providing a third hash of digital data stored within the portion of the dynamic database at a subsequent moment in time; and comparing the first hash and the third hash.

Figure 1:
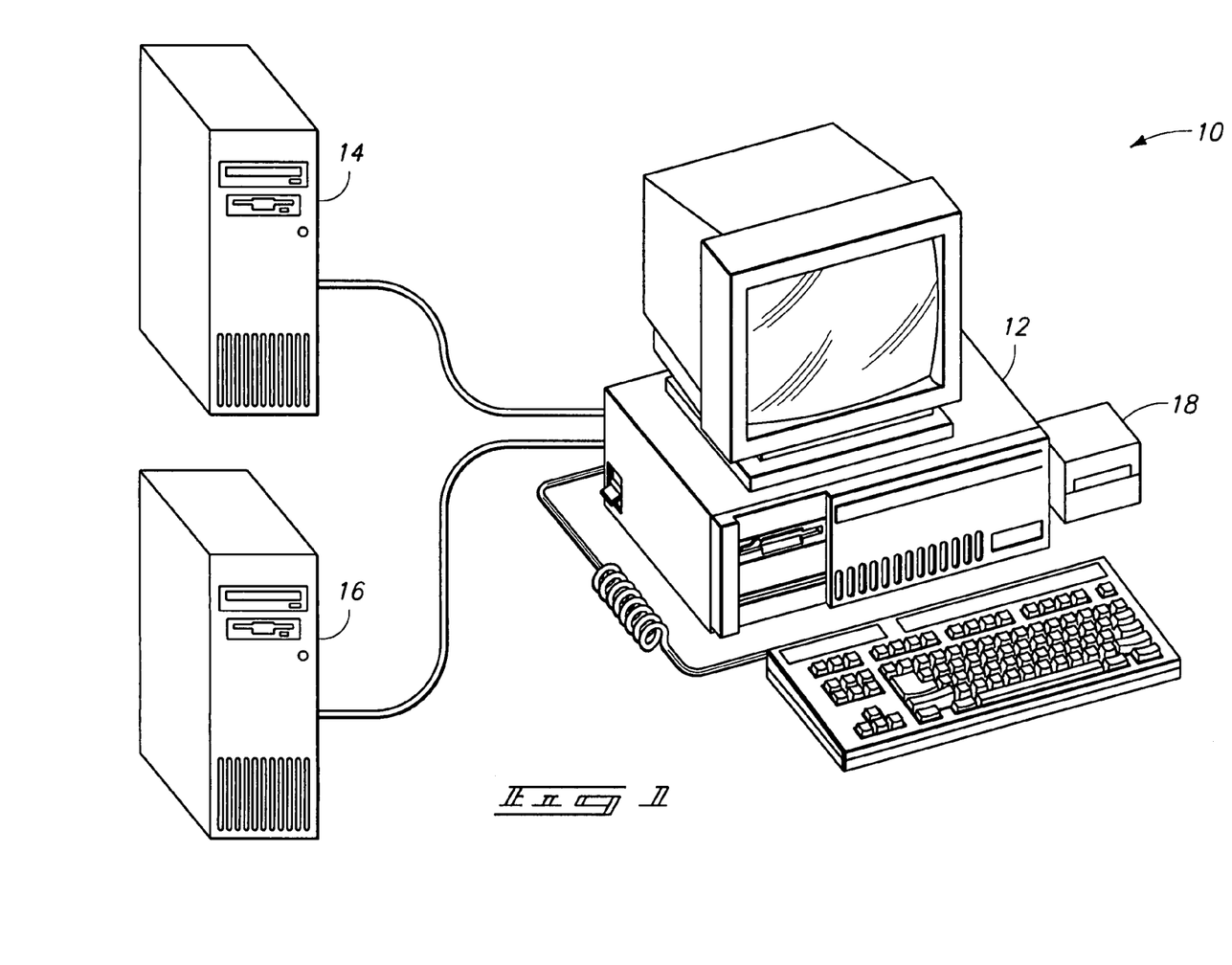
FIG. 1 is an isometric view of an exemplary digital data storage and verification system according to one embodiment of the present invention.

Referring to FIG. 1, an exemplary configuration of a digital data storage and verification system 10 is shown. The depicted configuration of system 10 includes a client terminal 12 coupled with a certificate authority (CA) server 14, an application server 16, and a card reading device of a private key management system 18. Client terminal 12 is implemented as a workstation personal computer (PC) configured to communicate with servers 14, 16 and the card reading device in the described arrangement.

Client terminal 12 comprises processing circuitry 13 such as a microprocessor configured to execute software instructions to perform digital data storage and verification operations described herein. An exemplary microprocessor is a Pentium III™ processor available from Intel Corporation. Such storage and verification operations may be implemented during a workflow wherein data is routed to one or more people or signing entities for approval and signature.

Certificate authority server 14 is utilized to implement public key infrastructure (PKI) operations in the described system arrangement. For example, certificate authority server 14 issues new digital certificates to a user (e.g., signer using client terminal 12) and digitally signs the user's certificate with the CA's private key so the user's certificate can be publically verified using the CA's public key at a later point in time.

Client terminal 12 accesses certificate authority server 14 to generate a private key and public key pair which enables a user via client terminal 12 to digitally sign data sets creating digital signatures. Typically, only a user has access to a given generated private key while the certificate authority server 14 stores the public key which corresponds to the private key. Server 14 also stores user identification information enabling subsequent retrieval of the public key corresponding to the particular user.

Numerous users may utilize client terminal 12 in some embodiments. Alternatively, numerous client terminals 12 (not shown) are provided within system 10. Such plural users input respective identification information which identifies themselves and their appropriate public key(s). The public keys may be used for verification of digital signatures previously signed by the users at subsequent points in time. Individual users have unique private keys and the associated public key(s) are stored within certificate authority server 14.

System 10 is described with a client/server Internet style architecture. Such is exemplary and other arrangements are possible. The depicted configuration could be implemented on a single machine or distributed between multiple servers without changes to basic 1 operations and data verification, retrieval and storage.

Figure 2:
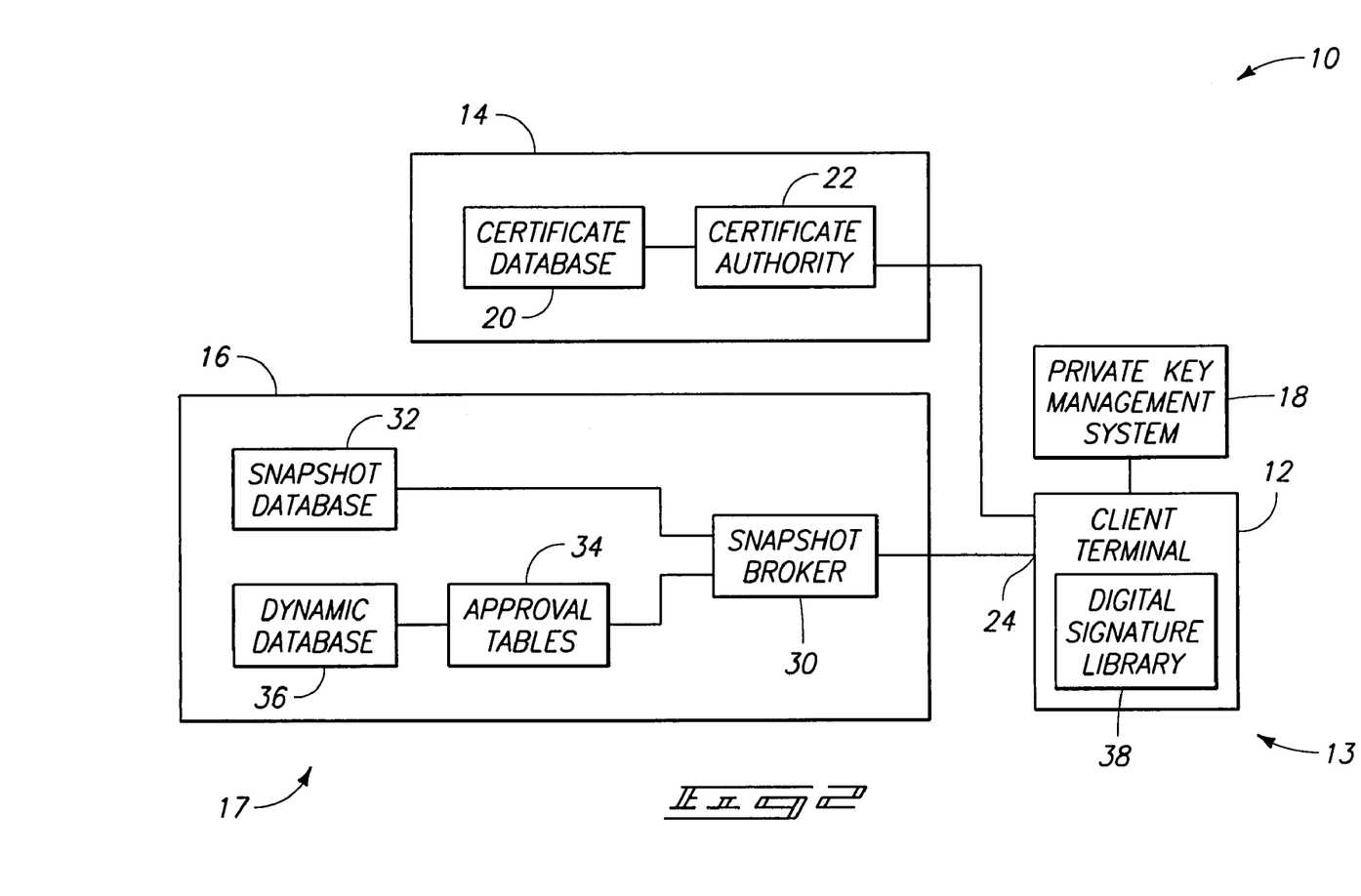
FIG. 2 is a functional block diagram of the system of FIG. 1.

Referring to FIG. 2, additional details of system 10 are shown. Private key management system 18 is coupled with client terminal 12. Private key management system 18 may be implemented at least in part as a smart card system wherein private keys and copies of the user certificates are stored on corresponding smart cards (e.g., Litronic tokens, Fortezza cards, etc.) of the user. Alternatively, private keys are stored within an Internet browser database (e.g., Explorer, Netscape, etc.) resident upon client terminal 12. Other implementations of private key management system 18 are possible. Any PKCS token can be utilized to manage private keys in the described embodiment. One exemplary arrangement of system 10 utilizes Litronic smart cards, RSA/MD5 algorithms, and internally managed certificate authority from Xcert International, Inc.

Private key management system 18 permits unlocking of private keys using pass-phrase or user identification information (also referred to as personal identification information) of corresponding users. Private key management system 18 is independent of specific encryption algorithms used to generate public-private key pairs at the time of certificate issuance (e.g., DSA, RSA, PGP, ECC, etc.) or other hash/ciphers chosen as part of encryption (DES, Triple-DES, MD5, SHA).

Certificate authority server 14 includes a certificate database 20 and certificate authority 22. Certificate database 20 includes public keys and certificates for current and past certificate holders (users) to be used when verifying digitally signed objects at subsequent points in time.

Certificate authority 22 comprises instruction code resident upon certificate authority server 14 configured to implement operations relative to user certificates and user public keys, including storage, retrieval and signing of such certificates and public keys including encryption of same with a private key corresponding to the respective certificate authority server 14.

Although the certificate authority server 14 typically does not have access to private keys of users, server 14 can revoke or periodically expire issued certificates to prevent new signatures from being created by given certificates. Currently available solutions for those wishing to internally implement their own certificate authority to manage their own certificates are available from Xcert International, Inc. and Entrust Technologies, for example. Alternatively, certificates may be rented from commercially recognized certificate authorities such as VeriSign, GTE, Thawt, AT&T, etc.

Less secure certificate management systems, such as PGP-based signature systems may be utilized wherein public keys are stored in public accessible databases. Regardless of the desired level of security, individual certificate authority issued certificates and individual public keys have a unique fingerprint identification (user identification information) which correlates them to a specific user. The certificates and public keys are signed by a mutually trusted validating party such as certificate authority 22 using its own private key, or in the case of PGP systems, other users can sign (vouch for) another user's certificate.

Application server 16 comprises storage circuitry 17 configured to store and retrieve static and dynamic digital data as described in further detail below. In the depicted arrangement, application server 16 comprises a snapshot broker 30, and storage circuitry 17 comprising a snapshot database 32, an approval table database 34, and a dynamic database 36.

In an exemplary arrangement, application server 16 implements client-server database system operations with respect to client terminal 12. Client terminal 12 is coupled via an interface 24 (such as a network interface card) with application server 16 and components within application server 16. Application server 16 presents data to client terminal 12 through graphical forms or a hierarchical tree of forms, for example, which may be approved and/or signed at various levels of a workflow by appropriate users. Such data presented for signature and approval at the various levels is retrieved from dynamic database 36 in the described configuration. Dynamic database 36 may be referred to as a target application for implementation of system 10 according to the present invention.

Dynamic database 36 is implemented as a relational database or an object-oriented database in exemplary embodiments. Data is stored within a plurality of interrelated portions, such as tables, columns, rows, fields, etc. of dynamic database 36. A given user may have authority to change and sign data in one or more portion but have restricted access to other portions. Other users may authority to review, change and sign data within all portions of dynamic database 36. Further, digital data stored within at least some portions of database 36 may dynamically change with respect to time (e.g., a given portion may receive and store updated information or data over a given period, of time while another portion contains the same data over the same period of time).

Snapshot broker 30 is configured to handle and manage requests from client terminal 12. In one exemplary implementation, snapshot broker 30 is provided as a server network domain. Such listens and processes requests from digital signature library 38 within a given client terminal 12. Snapshot broker 30 connects to dynamic database 36 to gather data to be reviewed, signed and/or verified as described below. In addition, snapshot broker 30 stores data sets of newly signed snapshots (described below) within snapshot database 32 and digital signatures which correspond to respective snapshots within approval tables 34.

The depicted structural components of FIG. 1 and FIG. 2 are exemplary. The indicated databases may be implemented within a single storage device, or in additional multiple storage devices in other embodiments. For example, approval tables 34 may be implemented as a portion of dynamic database 36, or implemented as a distinct database as shown in FIG. 2.

Snapshot database 32 is configured to store a series of snapshot data records which comprise historical flat or static records (also referred to as data sets) of possibly dynamic or changing digital data stored within dynamic database 36. Snapshot database 32 may be referred to as a static database. A user of client terminal 12 signs such snapshots of digital data at recorded points in time.

Snapshot database 32 provides an audit record that can be flat verified or cross-verified against current database entries of dynamic database 36 as described below. The flat verification of snapshots ensures that the static data of the snapshots and respective digital signatures have not changed since they were originally signed and binds the user to the data set they signed.

Cross-verification ensures that the data set of a given snapshot matches a corresponding data set within dynamic database 36 (i.e., the data from at least a portion of dynamic database 36 at an initial point of time when the snapshot was digitally signed matches the data within the corresponding portion of dynamic database 36 at a subsequent moment in time). Corresponding portions of dynamic database 36 refer to the same or matching tables, fields, rows, columns, etc. of dynamic database 36 at different moments in time regardless of the data stored in such portions. Cross-verification additionally verifies the data of dynamic database 36 at the subsequent point in time against the digital signature of the snapshot signed at the initial moment in time. Such is described in detail below.

Snapshot database 32 may additionally store a list of certificate authorities (such as CA server 14) which it trusts to authenticate users who originally digitally signed the data snapshots using their corresponding certificates. In the described arrangement, snapshot database is implemented as a lightweight directory access database (LDAP). Other arrangements are possible including implementing snapshot database as separate tables within dynamic database 36 comprising a target application database.

Digital signature library 38 is implemented as instruction code resident upon client terminal 12 for execution by processing circuitry 13. Digital signature library 38 provides an interface between user interface application forms from server 16 and digital signature components including private key management system 18, snapshot broker 30, and public key infrastructure (PKI) components such as certificate authority server 14. Digital signature library 38 coordinates communications intermediate servers 14, 16, private key management system 18 and client terminal 12. In the described configuration, digital signature library 38 utilizes TCP/IP communications. Other protocols are possible.

Approval tables 34 may be implemented as a separate database from dynamic database 36 or as distinct tables within dynamic database 36. Approval tables 34 are utilized to store digital signatures of respective snapshots during a given implementation of system 10.

Further, approval tables 34 store reference data regarding the digital signatures and snapshots. In general, approval tables 34 provide data and embedded procedures which bind flat historical snapshots with current data in dynamic database 36. For example, approval tables 34 store reference data such as database query information or procedures used to recreate respective snapshots of digital data stored within snapshot database 32 using dynamic database 36 at subsequent moments in time. Such query information can include identifiers for fields, rows, columns, tables, etc. of dynamic database 36 and is stored when the data set of the snapshot is digitally signed and referenced to the respective snapshot. Alternatively, the query information may identify a version controlled file which contains the database query procedures if such procedures are extensive.

Such query information may be recalled at subsequent moments in time to regenerate data from portions of dynamic database 36 corresponding to the stored snapshots (which were generated using data within dynamic database 36 from corresponding portions at an initial moment in time). Approval tables 36 also include identification information (also referred to as fingerprint identification information) identifying digital users or signers and their respective signed snapshots. For example, an employee identification number may be utilized to identify the signer of a snapshot or a fingerprint ID to identify the digital certificate used for signing.

Approval tables 34 also include data regarding workflow (i.e., routing of signed data between different levels of authority for multiple signatures) in the described embodiment. Approval tables 34 include a snapshot procedure map or "trees of forms" to provide single, digitally signable entities while removing variations in display formats (e.g., spaces, number of significant digits, etc.). Such reduces the chances that cross-verification would fail inappropriately even though stored data is correct.

Approval tables 34 also define how a given signature level changes over time so application forms and schemas (within certain constraints) can change over time but still preserve cross-verification of stored historical digital signatures with respect to corresponding current data within dynamic database 36 as described further below.

Such provides the ability to cross-verify actual current data of dynamic database 36 with historical snapshots of corresponding portions of dynamic database 36 while taking into account the fact that signature hierarchy may or may not restrict changes to certain portions of dynamic database 36 for a given signature or authority level in the workflow process.

As mentioned above, system 10 is configured to verify a data set of a snapshot stored at an initial moment in time against the digital signature of the snapshot (also made at the initial moment in time) at a subsequent moment in time (which may be days, months, years, etc. after the initial moment in time). Further, system 10 is configured to verify a data set present within a corresponding portion of the dynamic database 36 at a subsequent point in time, which also corresponds to the static or flat data set of the respective snapshot, against the digital signature of the snapshot made at the initial moment in time.

As generally used herein, an initial moment in time refers to a time when a snapshot is digitally signed by a user. Accordingly, the data set which is signed corresponds to data stored within at least a portion of dynamic database 36 at the initial moment in time. The snapshot of the data is stored in snapshot database 32 at this time. Further, the digital signature of the snapshot, identification information of the signer, and query information identifying corresponding portions of dynamic database 36 storing the snapshot data set are stored in approval tables 34 at the initial moment in time.

Subsequent moments in time occur after the initial moments in time and refer to periods of time wherein verification operations are performed as defined below. Verification operations include a first verification (also referred to as a flat verification) operation of verifying a data set of a snapshot with the digital signature of the snapshot. Such indicates whether the data set of the snapshot and the digital signature are valid.

Verifying operations also include a second verification (also referred to as cross-verification) operation of verifying a dynamic data set (defined as data within dynamic database 36 at the subsequent moment in time which corresponds to the data set of the snapshot signed at the initial moment in time) with the digital signature of the snapshot. Such indicates whether the dynamic data set of dynamic database 36 and the digital signature are valid.

Accordingly, if the first verification operation is valid and the second verification operation fails, it is known that the dynamic data set of dynamic database 36 has been changed.

The discussion of verification operations now continues with reference to depicted components of FIG. 2. Processing circuitry 13 is operable to generate a digital signature by digitally signing a snapshot data set extracted from dynamic database 36 (e.g., digital data within at least a portion of dynamic database 36 such as desired fields, rows, columns, tables, or any combination thereof) at an initial moment in time using the user's private key. Such digital signature of the snapshot includes time/date information as well as query information which can be utilized to generate a corresponding data set from dynamic database 36 at a subsequent moment in time.

The digital signature generated from the snapshot data set and identification information regarding the signer (user) is stored within approval tables 34 with references to one another. Further, query information (e.g., queries applied to dynamic database 36) for generating the data set corresponding to a given snapshot from dynamic database 36 is stored in approval tables 34 and referenced to the respective snapshot. Such enables comparison of digital data from a given portion (e.g., desired fields, rows, columns, tables, etc.) of dynamic database 36 at the initial moment of time with data within the corresponding portion (e.g., fields, rows, columns, tables, etc. corresponding to the above given portion) of dynamic database 36 at the subsequent moment in time.

For example, at such subsequent moment in time, the stored query procedure is applied to dynamic database 36 to extract the data set present within the corresponding portion of dynamic database 36 at the subsequent moment in time which may have changed from the initial moment in time. Such verifies the corresponding data set from dynamic database 36 at the subsequent moment in time against the corresponding digital signature of the snapshot.

In one exemplary method of verifying a data set of a snapshot against the digital signature in accordance with first verification operations, processing circuitry 13 of client terminal 12 is configured to initially provide a first hash of the data set within the snapshot to be verified from snapshot database 32. Processing circuitry 13 is also configured to request retrieval of the digital signature which corresponds to the snapshot to be verified from approval tables 34.

Processing circuitry 13 thereafter generates a second hash from the digital signature. Such second hash is generated using the public key corresponding to the private key of the user or other entity which originally digitally signed the data set of the snapshot to provide the digital signature corresponding to the snapshot to be verified. To determine the appropriate public key, processing circuitry 13 retrieves user identification information from approval tables 34 which also corresponds to the snapshot to be verified. Such user identification information is applied to certificate authority server 14 to extract the desired public key.

Following generation of the first hash and second hash, processing circuitry 13 compares the generated hashes to verify the data set of the snapshot against the digital signature. Any failure of verification indicates a change of the data set of the snapshot or the digital signature. Otherwise, both the snapshot data set and corresponding digital signature are valid.

As indicated, the present invention also provides verification of the dynamic data set in accordance with second verification operations. The first and second verification operations may be performed individually or together dependent upon the data set being verified.

In one exemplary methodology, processing circuitry 10 operates to extract query information from approval tables 34 utilized to extract the dynamic data set from dynamic database 36 at a subsequent point in 1 time after the corresponding data set was digitally signed at the initial moment in time to create the snapshot.

Using the appropriate query information, processing circuitry 13 extracts the data set within dynamic database 36 to obtain the dynamic data set. Such extracted dynamic data set is hashed by processing circuitry 13 to provide a third hash. Such third hash is compared with the second hash (determined from the digital signature) to verify the dynamic data set against the respective digital signature. No verification indicates different data within the dynamic data set with respect to the snapshot data set if the snapshot verification procedure (first verification operation) from above was verified.

Referring to FIG. 3–FIG. 6, exemplary methodologies of operation of client terminal 12 are shown. The depicted methodologies described further below may be implemented as software or firmware executable instructions within client terminal 12 for execution by processing circuitry 13. Alternatively, such methodologies may be implemented as hardware in another arrangement.

Figure 3:
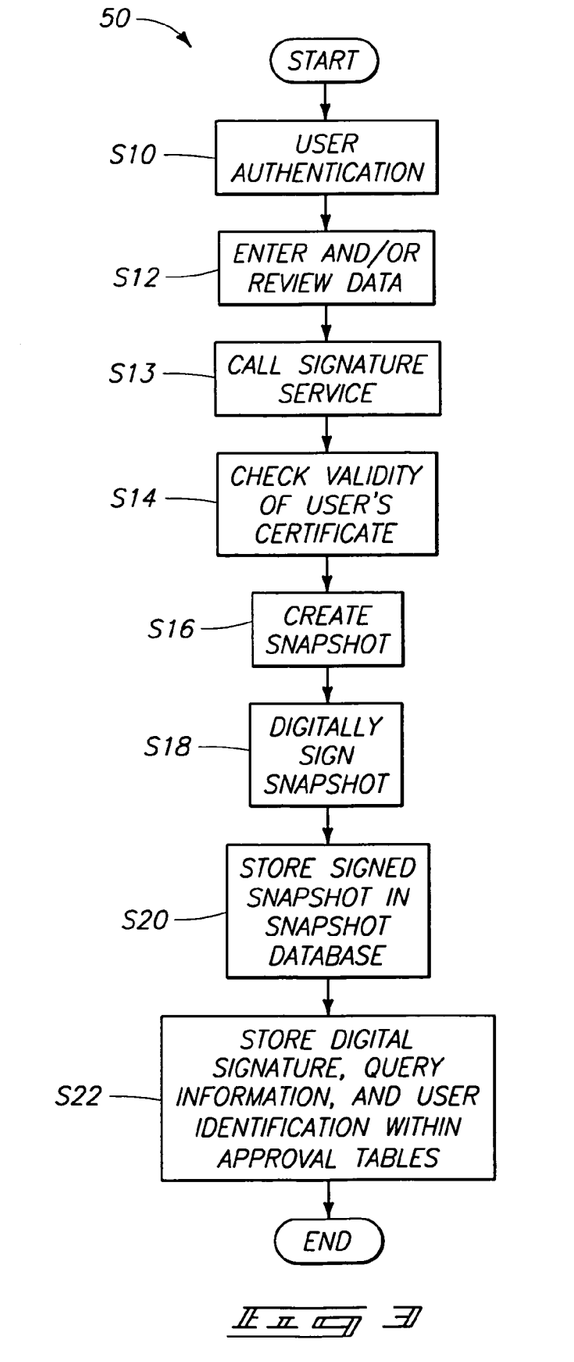
FIG. 3 is a flow chart illustrating an exemplary methodology for creating a digital signature.

Referring initially to FIG. 3, a methodology 50 for implementing digital signature operations of a snapshot data set is shown.

Upon execution of methodology 50, a user authentication procedure is performed at step S10. A user, such as an individual, may be required to input a log-on identification such as employee number, name or other identifying information at step S10.

Following successful authentication, a user enters and or reviews data presented in a form of a given application of application server 16 at step 12. Such can include a series of forms, checklists, etc. Such data is either entered or reviewed with respect to dynamic database 36.

At step S13, a user initiates a call for a digital or electronic signature service. For example, an approve button may be provided on an electronic form used to enter and or review data with respect to application server 16.

At step S14, an operation is conducted to check the validity of the user certificate. Such is typically performed with respect to certificate authority server 14 utilizing certificates stored within certificate database 20. The methodology 50 may be terminated if the user certificate is not found to be valid at step S14.

Otherwise, a snapshot of digital data either entered or reviewed via an application form is created at step S16. Such includes creating a flat or static file of data being reviewed or entered by the user.

At step S18, client terminal 12 operates to digitally sign the snapshot. Exemplary details of such digital signature of the data set of the snapshot are described further with reference to methodology 52 of FIG. 4.

At step S20, client terminal 12 sends the data set of the snapshot to application server 16 for storage. Snapshot broker 30 operates to store the snapshot data set in snapshot database 32.

At step S22, snapshot broker 30 operates to store the corresponding digital signature, query information and user identification information within approval tables 34.

Figure 4:
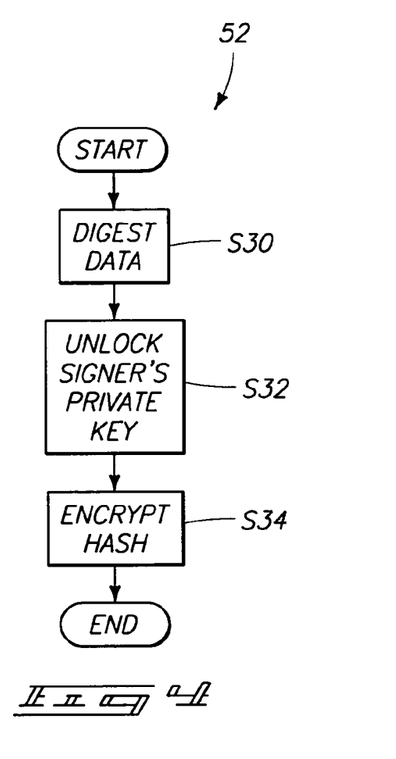
FIG. 4 is a flow chart illustrating further details of an exemplary methodology for creating a digital signature.

Referring to FIG. 4, methodology 52 depicts exemplary steps for digitally signing a created snapshot.

Initially at step S30, client terminal 12 digests the data set using a date/stamp as well as a snapshot procedure utilized to generate the snapshot. Such snapshot procedure can include query information of dynamic database 36 utilized to retrieve and generate the digital data within the stored snapshot. Step S30 can also be referred to as a hashing operation. Exemplary algorithms can be utilized to implement methodology 52 including MD5, MD4, SHA, etc.

At step S32, a personal identification number (PIN) or pass-phrase is utilized to unlock the private key of the user or signer.

A step S34, the hash created in step S30 is encrypted using digital signature operations and the user's private key to create the digital signature of the snapshot. Exemplary encryption algorithms include RSA, DSA, PGP, ECC, etc.

Figure 5:
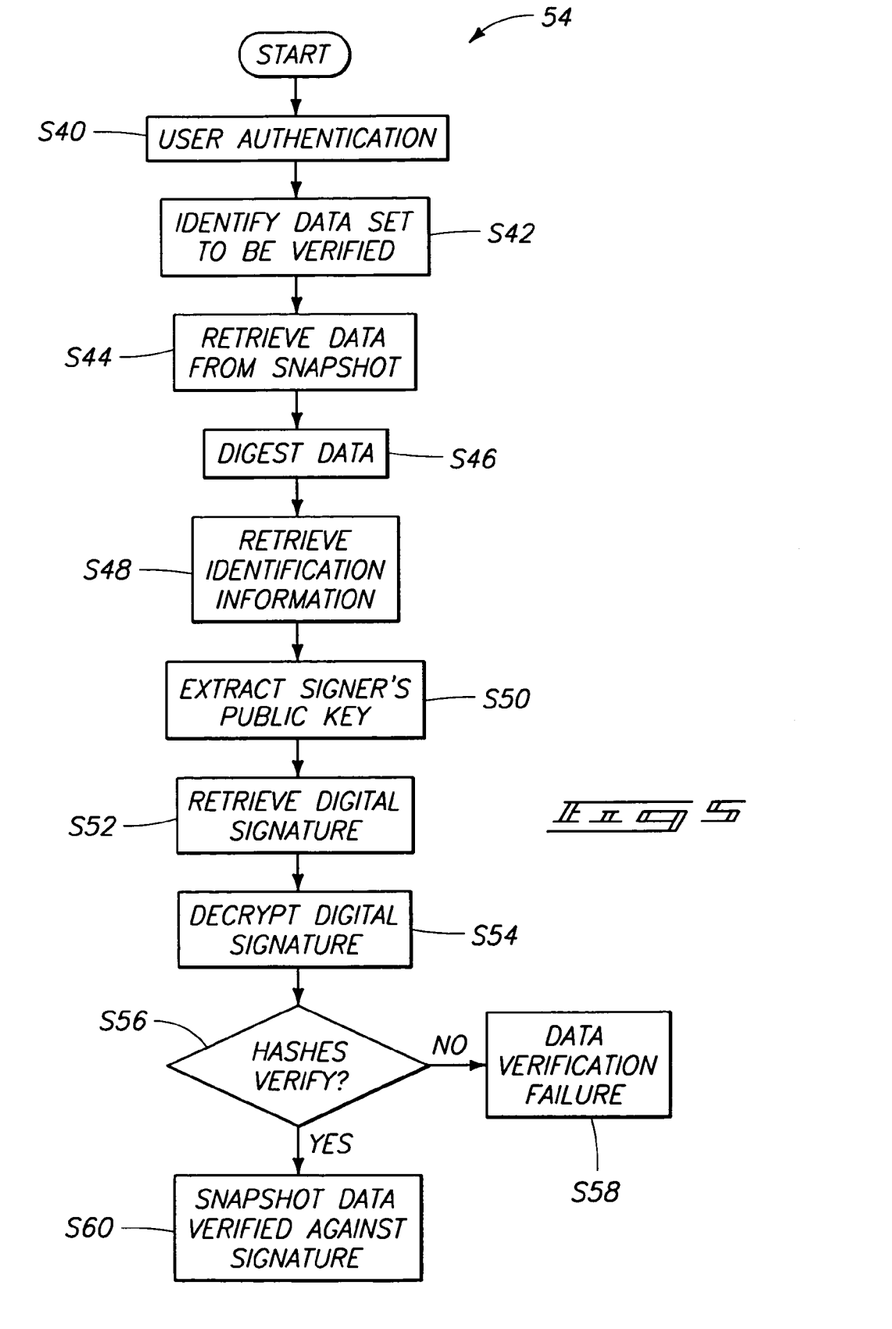
FIG. 5 is a flow chart illustrating an exemplary methodology of flat verification of a digital signature.

Referring to FIG. 5, an exemplary methodology for 54 performing snapshot or flat verification of a digital signature is illustrated. The depicted methodology 54 verifies that the data set and digital signature of such snapshot data have not been altered in any way since storage and creation of the snapshot.

In one embodiment of the invention, a digital certificate is not necessary for a user who wishes to verify another signature using methodology 54. A user with access to application server 16 can verify 4 another signature regardless if personally they have signature authority through a certificate in one exemplary configuration.

At step S40, a user logs on to the client terminal 12 using appropriate identification information.

At step S42, the user identifies a data set such as a snapshot to be verified. Such can be requested utilizing lookup forms presented to client terminal 12 from application server 16. At step S44, static data is retrieved from snapshot database 32 which corresponds to the identified snapshot to be verified.

At step S46, the retrieved data from step S44 is digested in a one-way hash operation.

At step S48, user identification information such as a signer identification, certificate identification, certificate authority identification is retrieved from approval tables 34 corresponding to the original signer of the data set.

At step S50, the public key corresponding to the entity which signed the snapshot is extracted from certificate database 20 of certificate authority 14 using the identification information retrieved at step S48.

At step S52, the stored digital signature which corresponds to the retrieved snapshot data is retrieved from approval tables at step S34.

At step S54, the digital signature retrieved at step S52 is decrypted using the public key extracted at step S50 to produce a hash.

At step S56, the hash created at step S46 and the hash created at step S54 are verified in a comparison operation.

If the hashes do not verify, a data verification failure is displayed indicating a change in either the digital signature or the snapshot data at step S58.

Otherwise, if the hashes are compared and verified successfully, the snapshot data is indicated as being verified against the signature at step S60.

Referring to FIG. 6, an exemplary methodology 56 for performing cross-verification of an electronic or digital signature of snapshot data with respect to corresponding digital data at a subsequent moment in time (i.e., dynamic data set) within dynamic database 36 is illustrated.

In one configuration of system 10, no digital certificate is needed for a user to verify another's signature. Anyone with access to dynamic database 36 can verify another's signature regardless if they personally have signature authority through a certificate in such a configuration. Methodology 56 may be launched automatically at critical points in an application's approval process (e.g., before a next review/signing level) as defined by an application's workflow in an exemplary arrangement.

At step S70, a user authentication operation is performed wherein proper users log-on to system 10.

At step S72, the user selects the appropriate data set of a desired snapshot to be verified.

At step S74, client terminal 12 retrieves information from approval tables 34 which corresponds to the identified data set of step S72. Such information can include an original date/time information utilized at step S30 to create the snapshot, and dynamic database query information utilized to retrieve dynamic data corresponding to the snapshot from the dynamic database 36.

At step S76, the retrieved query information is utilized to recreate the snapshot using current data stored within dynamic database 36.

The dynamic data set of information from dynamic database 36 which corresponds to the requested snapshot 32 is digested or hashed by client terminal 12 at step S78.

At step S80, client terminal 12 retrieves identification information regrading the user from approval tables 34. Such can also include certificate and certificate authority identification information corresponding to the signer of the snapshot data set.

At step S82, the public key of the user who originally signed the snapshot data is extracted at step S82 from certificate authority server 14.

At step S84, client terminal 12 retrieves the digital signature which corresponds to the snapshot from approval tables 34.

At step S86, a retrieved digital signature from step S84 is decrypted using the public key of the original signer. A decrypting operation creates a hash from the signature.

At step S88, the processing circuitry determines whether the hashes from steps S78 and S88 verify.

If not, a data cross-verification failure may be indicated at step S90 indicating the dynamic data set does not correspond to the data retrieved from the desired snapshot. Alternatively, such data cross-verification failure can also indicate a failed or corrupt digital signature retrieved from approval tables 34. However, if the flat verification of FIG. 5 is performed and verification is indicated, such would indicate corruption or other change within dynamic database 36.

Alternatively, if the condition of step S88 is affirmative, the digital signature of the snapshot data is verified against the dynamic data set of the dynamic database 36 as indicated at step S92.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A computer comprising:
an interface adapted to couple with a dynamic database; and
processing circuitry configured to provide a first hash from digital data stored within a portion of the dynamic database at an initial moment in time, to provide a second hash from digital data stored within the portion of the dynamic database at a subsequent moment in time, and to compare the first hash and the second hash.

2. The computer according to claim 1 wherein the processing circuitry is configured to provide a digital signature using digital data stored within the portion of the dynamic database at the initial moment in time, and to provide the first hash using the digital signature.

3. The computer according to claim 2 wherein the processing circuitry is configured to decrypt the digital signature to provide the first hash.

4. The computer according to claim 2 wherein the processing circuitry is configured to decrypt the digital signature using a public key corresponding to a private key of an entity which provided the digital signature at the initial moment in time.

5. A system comprising:
storage circuitry configured to store digital data at least some of which dynamically changes with respect to time, and to store a digital signature generated using digital data stored within the storage circuitry at an initial moment in time; and
processing circuitry configured to provide a first hash from the digital signature, and to provide a second hash from digital data stored within the storage circuitry at a subsequent moment in time and corresponding to the digital data of the digital signature, and to compare the first hash and the second hash.

6. The system according to claim 5 wherein the digital data of the digital signature is stored within a portion of the storage circuitry at the initial moment of time and the digital data stored within a storage circuitry at the subsequent moment in time is stored in the portion of the storage circuitry.

7. The system according to claim 6 wherein the portion of the storage circuitry used to stored the digital data at the initial and subsequent moments in time comprises a common portion of a database.

8. The system according to claim 5 wherein the processing circuitry utilizes a public key corresponding to a private key of an entity which provided the digital signature at the initial moment in time to provide the first hash from the digital signature.

9. The system according to claim 5 wherein the storage circuitry comprises a relational database.

10. The system according to claim 5 wherein the storage circuitry is configured to store a static form of the digital data stored at the initial moment in time, and the processing circuitry is configured to provide the digital signature using the static form of the digital data, to provide a third hash from the static form of the digital data, and to compare the third hash with the first hash.

11. The system according to claim 5 wherein the storage circuitry is configured to store query information regarding storage of the digital data of the digital signature at the initial moment in time, and the processing circuitry is configured to use the query information to retrieve the digital data stored within the storage circuitry at the subsequent moment in time to provide the second hash.

12. A digital data system comprising:
storage circuitry configured to store digital data at least some of which dynamically changes with respect to time; and
processing circuitry configured to compare a first hash and a second hash, wherein the first hash corresponds to digital data stored within the storage circuitry at an initial moment in time and the second hash corresponds to digital data stored within the storage circuitry at a subsequent moment in time.

13. The system according to claim 12 wherein the digital data corresponding to the first hash is stored within a portion of the storage circuitry at the initial moment of time and the digital data stored within the storage circuitry at the subsequent moment in time is stored in the portion of the storage circuitry.

14. The system according to claim 13 wherein the portion of the storage circuitry used to stored the digital data at the initial and subsequent moments in time comprises a common portion of a database.

15. The system according to claim 12 wherein the processing circuitry is configured to provide a digital signature using the digital data stored within the dynamic database at the initial moment in time, and to provide the first hash using the digital signature.

16. The system according to claim 15 wherein the processing circuitry utilizes a public key corresponding to a private key of an entity which provided the digital signature at the initial moment in time to provide the first hash from the digital signature.

17. The system according to claim 15 wherein the storage circuitry is configured to store a static form of the digital data stored at the initial moment in time, and the processing circuitry is configured to provide the digital signature using the static form of the digital data, to provide a third hash from the static form of the digital data, and to compare the third hash with the first hash.

18. The system according to claim 12 wherein the storage circuitry comprises a relational database.

19. The system according to claim 12 wherein the storage circuitry is configured to store query information regarding storage of the digital data at the initial moment in time, and the processing circuitry is configured to use the query information to retrieve the digital data stored within the storage circuitry at the subsequent moment in time to provide the second hash.

20. A digital data storage system comprising:
  a dynamic database containing a plurality of tables individually configured to store digital data;
  a snapshot database configured to store a snapshot of digital data retrieved from at least one table of the dynamic database at an initial moment in time;
  an approval database configured to store a digital signature of the snapshot; and
  a client configured to provide the digital signature from the snapshot, to provide a first hash from the snapshot, to provide a second hash from the digital signature, to compare the first hash and the second hash, to provide a third hash from data stored within the at least one table of the dynamic database at a subsequent moment in time, and to compare the third hash and the second hash.

21. A data verification method comprising:
  storing digital data at an initial moment in time within a dynamic database;
  providing a first hash of the digital data stored at the initial moment in time;
  providing a second hash of digital data within the dynamic database at a subsequent moment in time; and
  comparing the first hash and the second hash.

22. The method according to claim 21 wherein storing comprises storing in a portion of the dynamic database, and the providing the second hash comprises providing using digital data stored in the portion at the subsequent moment in time.

23. The method according to claim 21 further comprising providing a digital signature using the digital data stored at the initial moment in time, and wherein the providing the first hash comprises providing using the digital signature.

24. The method according to claim 23 wherein the providing the first hash comprises providing using a public key which corresponds to a private key of an entity which provided the digital signature at the initial moment in time.

25. The method according to claim 21 wherein the storing comprises storing within a dynamic database comprising a relational database.

26. The method according to claim 21 further comprising:
  storing a static form of the digital data stored at the initial moment in time;
  providing a digital signature using the static form;
  providing a third hash using the static form; and
  comparing the third hash and the first hash.

27. The method according to claim 21 further comprising:
  storing query information regarding the storing; and
  retrieving digital data within the dynamic database at the subsequent moment in time using the query information.

28. A data verification method comprising:
  providing digital data at an initial moment in time within a portion of a dynamic database;
  storing a static form of the digital data stored at the initial moment in time within a static database;
  providing a digital signature using the static form of the digital data;
  providing a first hash of the digital data stored at the initial moment in time using the digital signature;
  providing a second hash of the digital data stored at the initial moment in time using the static form of the digital data;
  comparing the first hash and the second hash;
  providing a third hash of digital data stored within the portion of the dynamic database at a subsequent moment in time; and
  comparing the first hash and the third hash.

29. The method according to claim 28 wherein the providing the first hash comprises providing using a public key which corresponds to a private key of an entity which provided the digital signature.

30. The method according to claim 28 wherein the providing digital data at the initial moment in time comprises providing query information regarding storage of the digital data at the initial moment in time within the portion of the dynamic database, and wherein the providing the third hash comprises retrieving the digital data stored within the portion of the dynamic database using the query information.

31. The method according to claim 28 wherein the providing digital data comprises providing within a portion of a relational database.

* * * * *